US008009155B2

(12) United States Patent
Chen et al.

(10) Patent No.: US 8,009,155 B2
(45) Date of Patent: Aug. 30, 2011

(54) OUTPUT BUFFER OF A SOURCE DRIVER APPLIED IN A DISPLAY

(75) Inventors: Ying-Lieh Chen, Sinshih Township, Tainan County (TW); Chin-Tien Chang, Sinshih Township, Tainan County (TW); Hsu-Yu Hsiao, Sinshih Township, Tainan County (TW)

(73) Assignee: Himax Technologies Limited (TW)

( * ) Notice: Subject to any disclaimer, the term of this patent is extended or adjusted under 35 U.S.C. 154(b) by 786 days.

(21) Appl. No.: 12/061,255

(22) Filed: Apr. 2, 2008

(65) Prior Publication Data

US 2009/0251174 A1 Oct. 8, 2009

(51) Int. Cl.
*G06F 3/038* (2006.01)
*G09G 5/00* (2006.01)

(52) U.S. Cl. ............ 345/204; 345/87; 345/100; 345/98; 345/210; 345/690; 327/108

(58) Field of Classification Search .................. 345/100, 345/204
See application file for complete search history.

(56) References Cited

U.S. PATENT DOCUMENTS

| | | | | |
|---|---|---|---|---|
| 2002/0158834 | A1* | 10/2002 | Blankenship et al. | 345/100 |
| 2004/0263446 | A1* | 12/2004 | Kawase et al. | 345/87 |
| 2005/0134542 | A1* | 6/2005 | Iitsuka | 345/98 |
| 2005/0168432 | A1* | 8/2005 | Park | 345/100 |
| 2006/0238527 | A1* | 10/2006 | Walker et al. | 345/204 |
| 2006/0279514 | A1* | 12/2006 | Yokota et al. | 345/100 |
| 2007/0139351 | A1* | 6/2007 | Hashimoto | 345/100 |
| 2009/0219270 | A1* | 9/2009 | Penev et al. | 345/211 |

* cited by examiner

*Primary Examiner* — Richard Hjerpe
*Assistant Examiner* — Christopher Thompason
(74) *Attorney, Agent, or Firm* — Hayes Soloway P.C.

(57) ABSTRACT

An output buffer and a controlling method are disclosed. The output buffer comprises an upper buffer and a lower buffer. In the controlling method, at first, a first voltage (V1) and a second voltage (V2) are applied on the upper buffer, and a third voltage (V3) and a fourth voltage (V4) are applied on the lower buffer, wherein V1>V2, V1>V4, V3>V2, and V3>V4. Then, the upper buffer is operated to output data to a plurality of pixels thereby operating the liquid crystals of the pixels over an upper supply range, wherein the upper supply range is from V1 to V2. Thereafter, the lower buffer is operated to output data to the pixels thereby operating the liquid crystals of the pixels over a lower supply range, wherein the lower supply range is from V3 to V4.

15 Claims, 6 Drawing Sheets

OUTPUT BUFFER OF A SOURCE DRIVER APPLIED IN A DISPLAY

FIELD OF THE INVENTION

This invention relates to an output buffer and the controlling method thereof, and more particularly, to an output buffer of a source driver applied in a display.

BACKGROUND OF THE INVENTION

Referring to FIG. 1. FIG. 1 is a structure diagram showing a liquid crystal display (LCD) system 10. Liquid crystal display (LCD) system 10 usually includes an LCD array that is organized according to rows and columns. A timing and control block receives video data and generates the necessary timing signals to selectively activate pixels in the LCD system. The timing and control signals activate a pixel by enabling a source driver and a gate driver. Thin film transistor (TFT) type displays have a transistor array that is placed on top of liquid crystal array to be controlled by the source driver and data driver.

Pixels in the LCD are arranged as charge storage elements that are represented as capacitors. The charge stored in the pixel is an analog quantity that determines the brightness associated with the pixel. For color pixel arrays, the color associated with a selected pixel is determined by the charge stored in each of the pixels associated with the color planes. A typical color LCD also requires hundreds of buffer amplifiers to drive all of the columns in the display.

For driving the LCD array, a plurality of output buffers are used in the source driver, and the output buffers consumes much power when they work. Therefore, the present invention presents a buffer consumes lesser power.

SUMMARY OF THE INVENTION

Therefore, an aspect of the present invention is to provide an output buffer and a controlling method thereof.

According to an embodiment of the present invention, the output buffer comprises an upper buffer and a lower buffer. The upper buffer is used to output a positive polarity signal for driving a data line of the graphic display over an upper supply range which is from a first voltage (V1) to a second voltage (V2), the upper buffer comprising a first upper supply terminal and a first lower supply terminal, wherein the first voltage (V1) is applied to the first upper supply terminal, and the second voltage (V2) is applied to the first lower supply terminal. The lower buffer is used to output a negative polarity signal for driving another data line of the graphic displayer over a lower supply rang which is from a third voltage (V3) to a fourth voltage (V4), the lower buffer comprising an second upper supply terminal and a second lower supply terminal, wherein the third voltage (V3) is applied to the second upper supply terminal, and the fourth voltage (V4) is applied to the second lower supply terminal. The relationship between first voltage V1, second voltage V2, third voltage V3, and fourth voltage are V2>V4, V1>V2, V1>V4, V3>V2, and V3>V4.

According to another embodiment of the present invention, the relationship between first voltage V1, second voltage V2, third voltage V3, and fourth voltage are V2=Vcom−ΔV, V3=Vcom+ΔV, V1>V3 and V2>V4, wherein the voltage difference ΔV and common voltage Vcom are predetermined voltage values.

According to still another embodiment of the present invention, the voltage difference ΔV is smaller than a difference between the first voltage (V1) and the fourth voltage (V4) voltage.

According to further another embodiment of the present invention, the voltage difference ΔV is smaller than 1 volt and greater than 0.2 volt.

According to further another embodiment of the present invention, the second voltage is one half of a difference between the first voltage V1 and the fourth voltage V4, and the third voltage V3 is equal to the first voltage V1.

According to further another embodiment of the present invention, the third voltage V3 is one half of a difference between the first voltage V1 and the fourth voltage V4, and the second voltage V2 is equal to the fourth voltage V4.

According to further another embodiment of the present invention, the controlling method comprises: providing an upper buffer and a lower buffer, wherein the upper buffer comprises a first upper supply terminal and a first lower supply terminal, and the lower buffer comprises a second upper supply terminal and a second lower supply terminal; applying a first voltage (V1) on the first upper supply terminal, and applying a second voltage (V2) on the first upper supply terminal, and applying a third voltage (V3) on the second upper supply terminal, and applying a fourth voltage (V4) on the second lower supply terminal, wherein V1>V2, V1>V4, V3>V2, and V3>V4; using the upper buffer to output data to a plurality of pixels thereby operating the liquid crystals of the pixels over an upper supply range, wherein the upper supply range is from V1 to V2; and using the lower buffer to output data to the pixels thereby operating the liquid crystals of the pixels over a lower supply range, wherein the lower supply range is from V3 to V4.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

In order to make the illustration of the present invention more explicit and complete, the following description is stated with reference to FIG. 2 through FIG. 6

Figure 1:
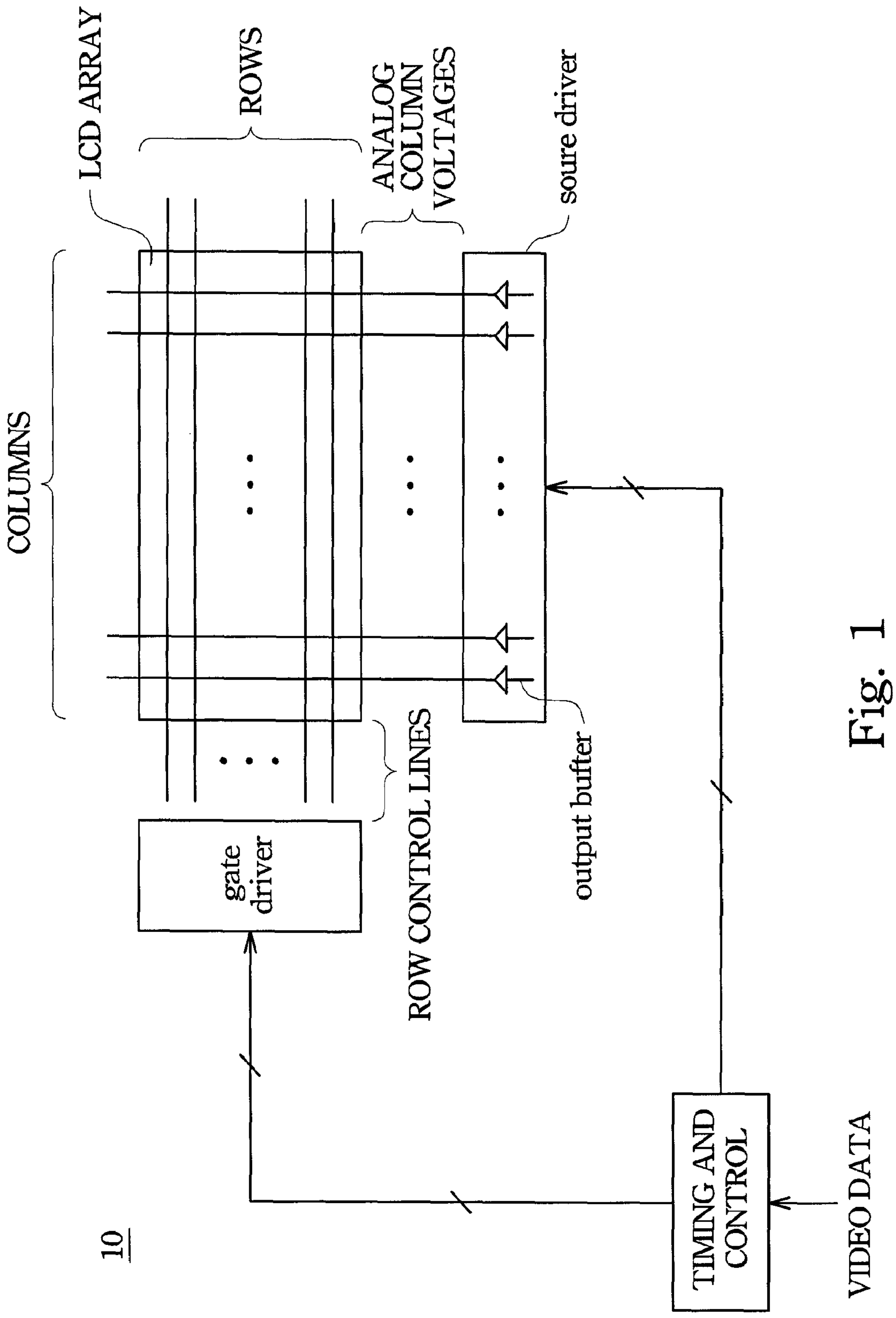
FIG. 1 is a structure diagram showing a liquid crystal display (LCD) system.
Figure 2:
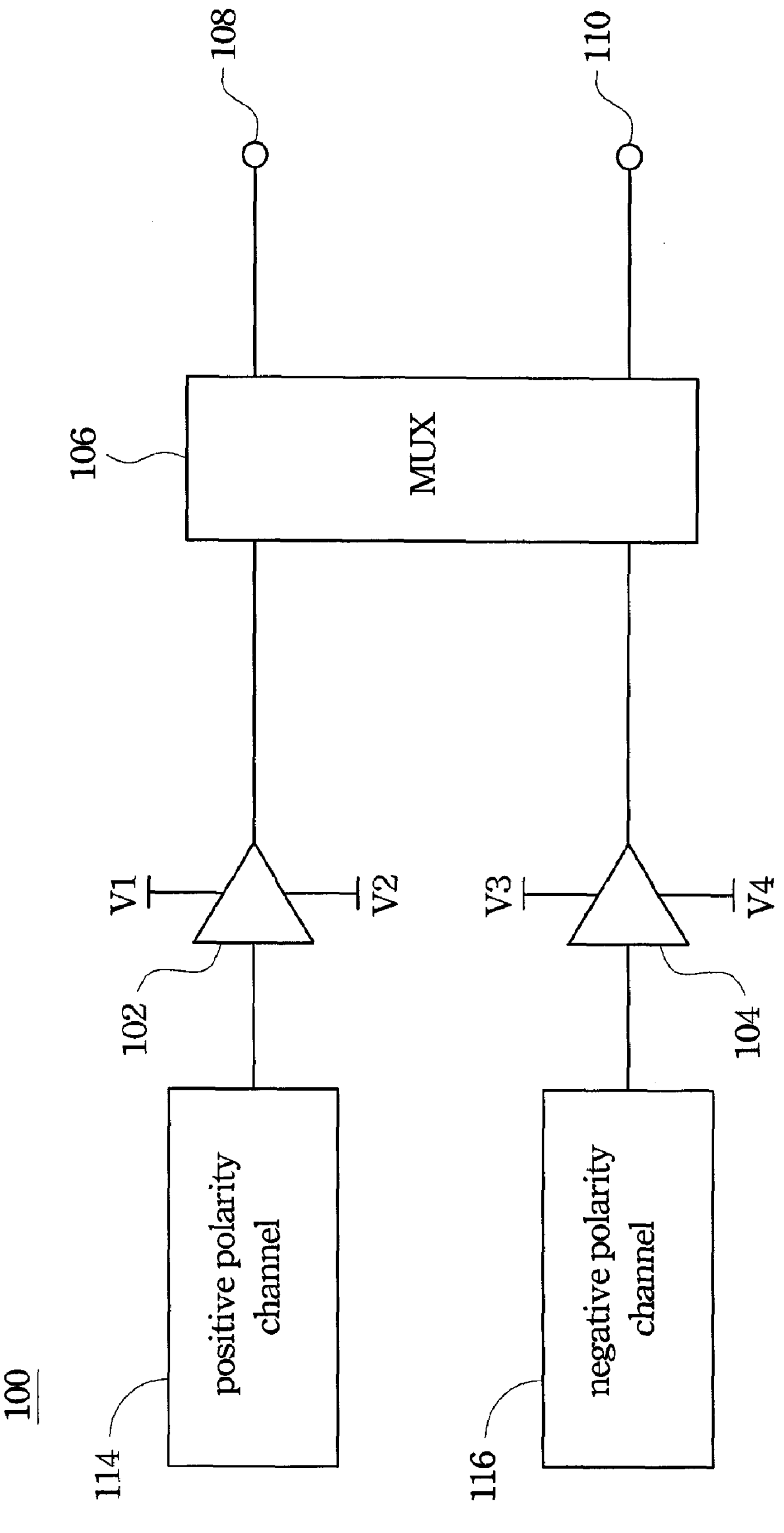
FIG. 2 is a structure diagram showing an output buffer according to an embodiment of the present invention.

Referring to FIG. 2. FIG. 2 is a structure diagram showing an output buffer 100 according to an embodiment of the present invention. The output buffer 100 comprises an upper buffer 102 and a lower buffer 104. The upper buffer 102 is electrically connected to a MUX (multiplexer) 106, and the MUX 106 is electrically connected to even data lines 108 and odd data lines 110 to connect the upper buffer 102 with the even data lines 108 or the odd data lines 110. Similarly, the lower buffer 104 is electrically connected to the MUX 106, and the MUX 106 also connects the lower buffer 104 with the even data lines 108 or the odd data lines 110. The upper buffer 102 is also connected to a positive polarity channel 114 to output a positive polarity signal provided by the positive polarity channel 114 for driving a data line of the graphic display over an upper supply range which is from a first voltage V1 to a second voltage V2. The upper buffer 102 comprising a first upper supply terminal and a first lower supply terminal, wherein the first voltage V1 is applied to the first upper supply terminal, and the second voltage V2 is applied to the first lower supply terminal. The lower buffer 104 is also connected to a negative polarity channel 116 to output a negative polarity signal provided by the negative polarity channel 116 for driving another data line of the graphic displayer over a lower supply rang which is from a third voltage V3 to a fourth voltage V4, the lower buffer comprising an second upper supply terminal and a second lower supply terminal, wherein the third voltage V3 is applied to the second upper supply terminal, and the fourth voltage V4 is applied to the second lower supply terminal. In this embodiment, when the upper buffer 102 outputs the positive polarity signal to the even data lines 108, the lower buffer 104 outputs the negative polarity signal to the odd data lines 110. In contrast, when the lower buffer 104 outputs the negative signal to the even data lines 108, the upper buffer 102 outputs the positive polarity signal to the odd data lines. In addition, in this embodiment, the relationship between first voltage V1, second voltage V2, third voltage V3, and fourth voltage are V1>V2, V1>V4, V3>V2, and V3>V4.

The upper buffer 102 and lower buffer 104 operate over a power range which is smaller than a total power range (e.g V1-V2 and V2-V3). The upper buffer 102 and lower buffer 104 need not provide outputs levels that swing over the entire supply range (V1 through V4). Since the upper buffer 102 and lower buffer 104 only operate over a smaller power range, the power consumption of the upper buffer 102 and lower buffer 104 are decreased.

Figure 3:
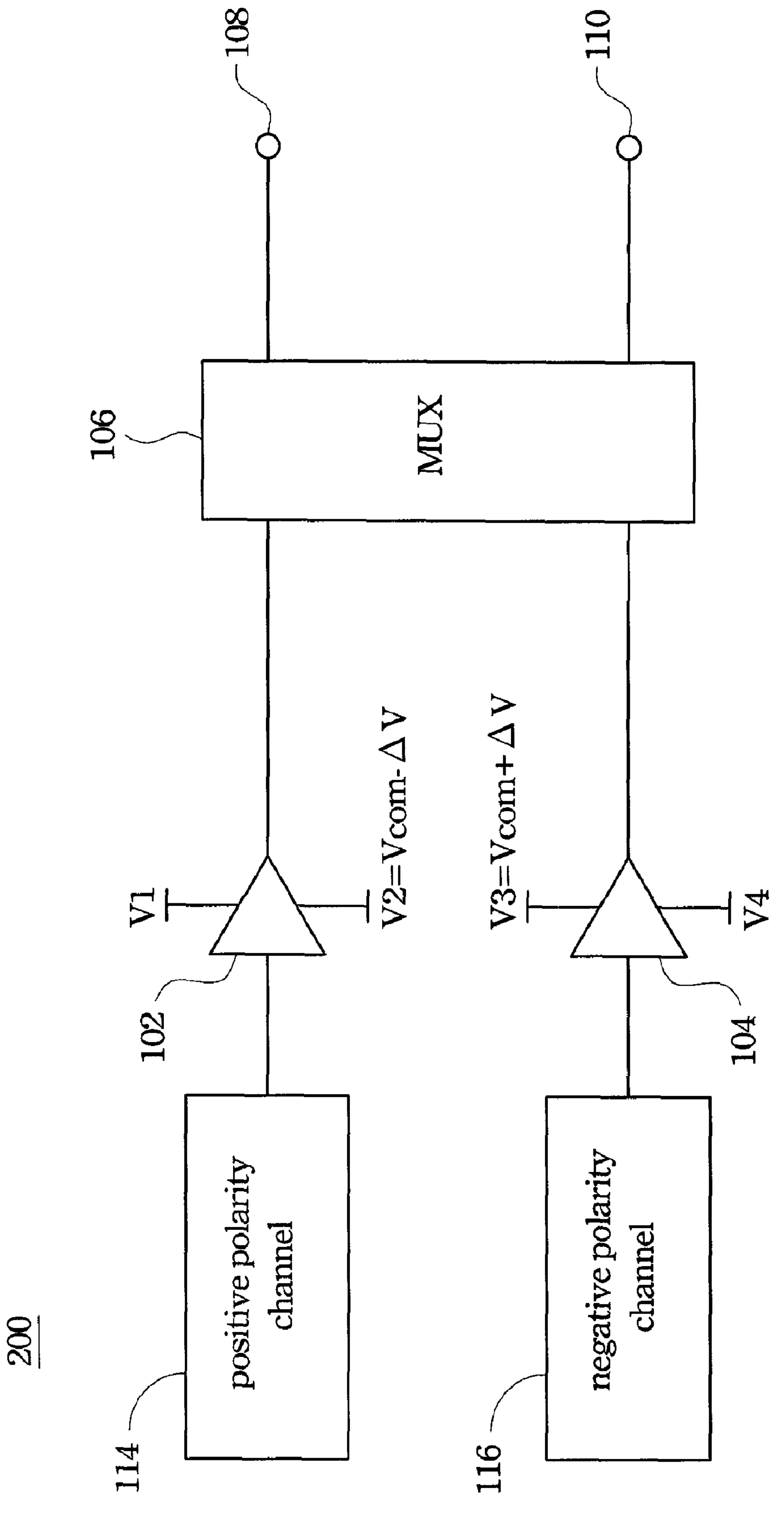
FIG. 3 is a structure diagram showing an output buffer 200 according to another embodiment of the present invention.

Referring to FIG. 3. FIG. 3 is a structure diagram showing an output buffer 200 according to another embodiment of the present invention. The output buffer 200 is similar to the buffer 100, but the difference is in that the relationship between first voltage V1, second voltage V2, third voltage V3, and fourth voltage are V2=Vcom−ΔV, V3=Vcom+ΔV, V1>V3 and V2>V4, wherein the voltage difference ΔV and common voltage Vcom are predetermined voltage values.

In addition, the voltage difference ΔV can be smaller than one half of the first voltage V1 and preferably be smaller than 1 volt and greater than 0.2 volt.

Figure 4:
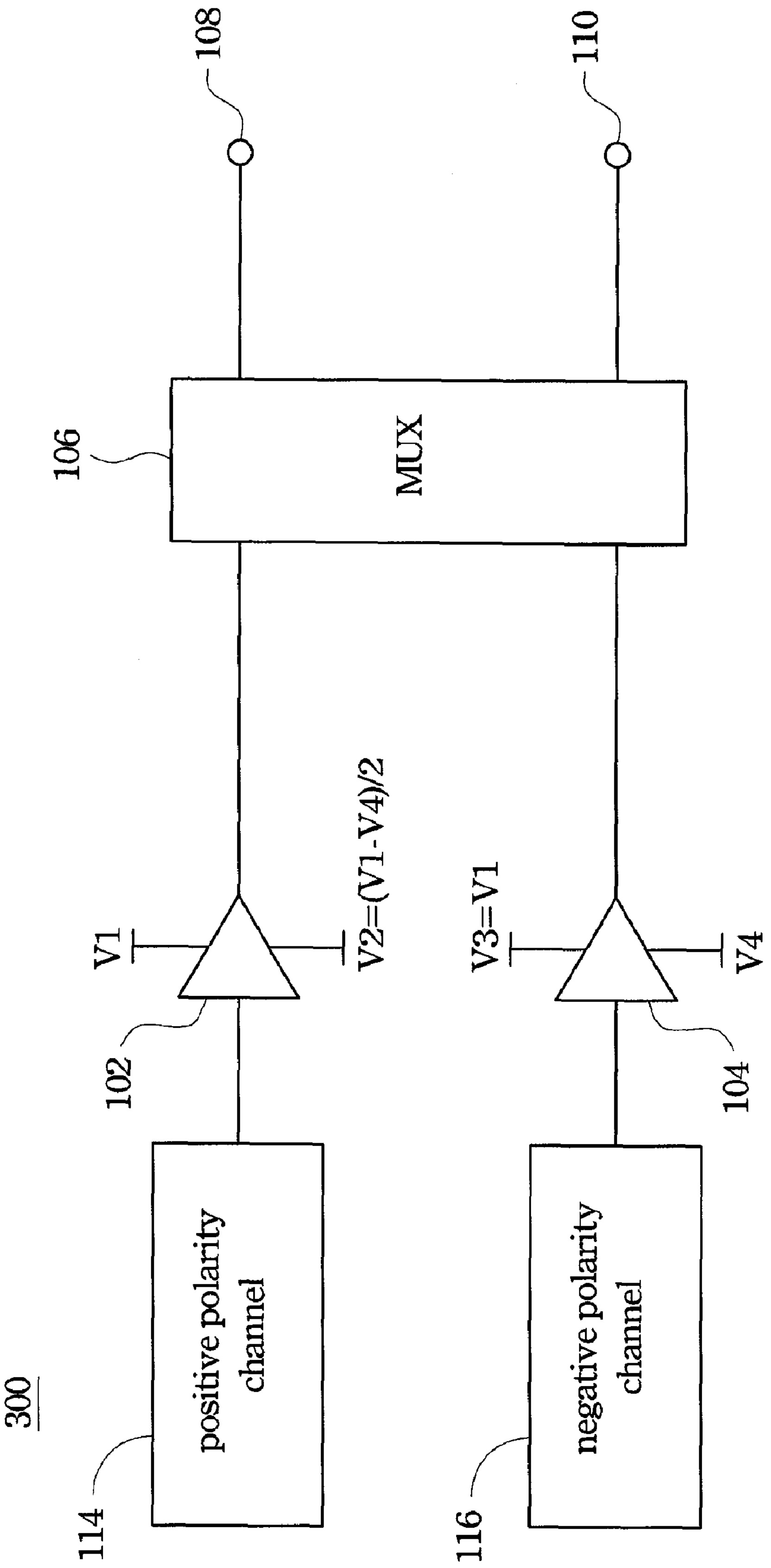
FIG. 4 is a structure diagram showing an output buffer according to still another embodiment of the present invention.

Referring to FIG. 4. FIG. 4 is a structure diagram showing an output buffer 300 according to still another embodiment of the present invention. The output buffer 300 is similar to the buffer 100, but the difference is in that the second voltage V2 is one half of a difference between the first voltage V1 and the fourth voltage V4, and the third voltage V3 is equal to the first voltage V1.

Figure 5:
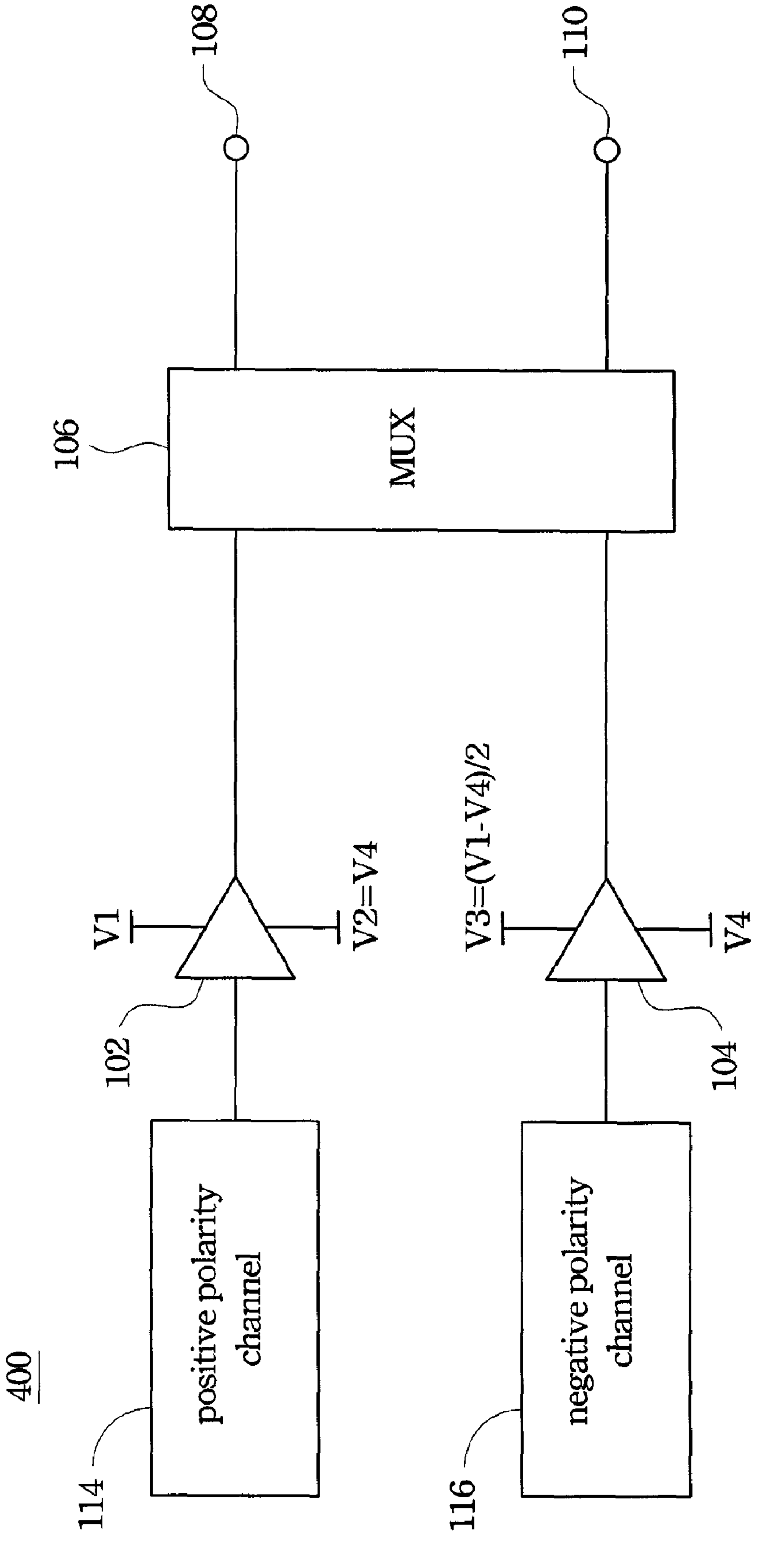
FIG. 5 is a structure diagram showing an output buffer according to further another embodiment of the present invention.

Referring to FIG. 5. FIG. 5 is a structure diagram showing an output buffer 400 according to further another embodiment of the present invention. The output buffer 400 is similar to the buffer 100, but the difference is in that the third voltage V3 is one half of a difference between the first voltage V1 and the fourth voltage V4, and the second voltage V2 is equal to the fourth voltage V4.

In view of the above description, the buffers of the embodiments of the present invention reduce the power consumption when the polarity of the liquid crystal is changed.

Figure 6:
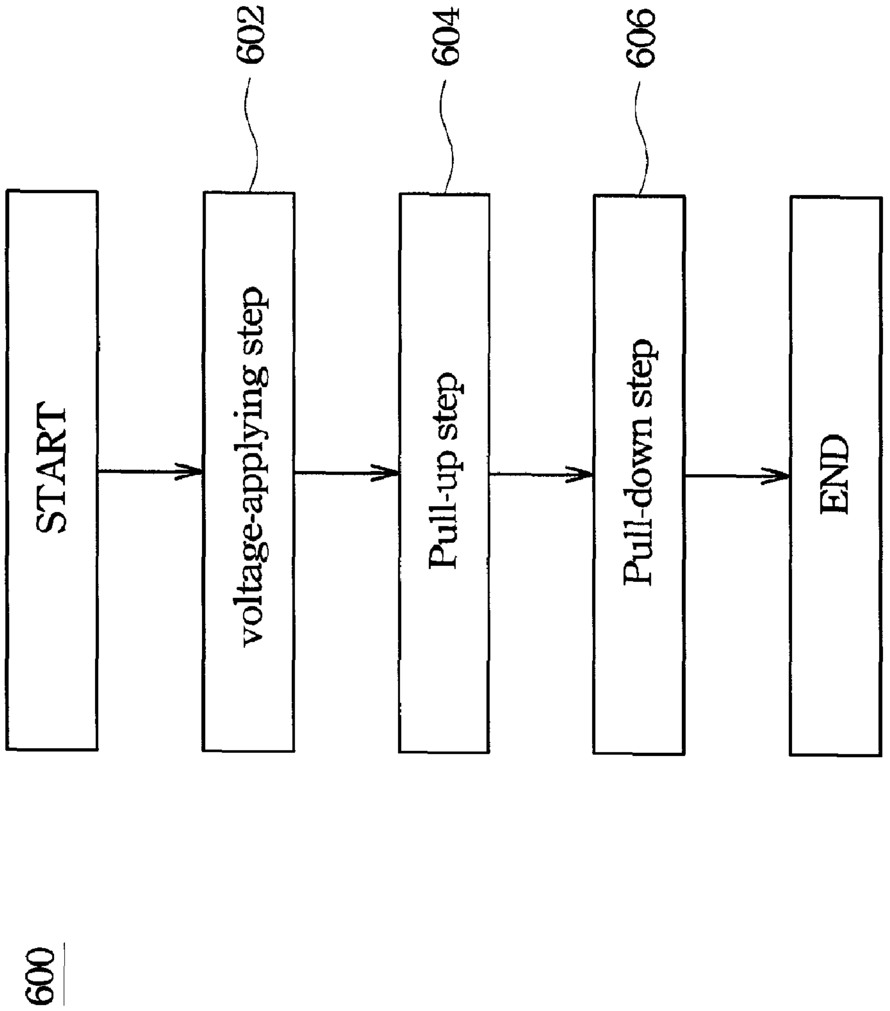
FIG. 6 is a flow chart showing a controlling method of the output buffer according to further another embodiment of the present invention.

Referring to FIG. 6. FIG. 6 is a flow chart showing a controlling method 600 of the output buffer 100 according to further another embodiment of the present invention.

In the controlling method 600, at first, a voltage-applying step 602 is performed. In the voltage-applying step 602, the first voltage V1 is performed on the first upper supply terminal; the second voltage V2 is applied on the first lower supply terminal; the third voltage V3 is applied on the second upper supply terminal; and a fourth voltage V4 is applied on the second lower supply terminal, wherein V1>V2, V1>V4, V3>V2, and V3>V4. Then a pull-up step 604 is performed. In the pull-up step 604, the upper buffer 102 is operated to output data to pixels of a LCD panel, thereby operating the liquid crystals of the pixels over an upper supply range, wherein the upper supply range is from V1 to V2. Thereafter, a pull-down step 606 is performed. In the pull-down step 606, the lower buffer is operated to output data to the pixels thereby operating the liquid crystals of the pixels over a lower supply range, wherein the lower supply range is from V3 to V4.

As is understood by a person skilled in the art, the foregoing embodiments of the present invention are strengths of the present invention rather than limiting of the present invention. It is intended to cover various modifications and similar arrangements included within the spirit and scope of the appended claims, the scope of which should be accorded the broadest interpretation so as to encompass all such modifications and similar structures.

What is claimed is:

1. An output buffer of a source driver applied in a display, wherein the output buffer comprises:

an upper buffer used to output a positive polarity signal for driving a data line of the graphic display over an upper supply range which is from a first voltage (V1) to a second voltage (V2), the upper buffer comprising a first upper supply terminal and a first lower supply terminal, wherein the first voltage (V1) is applied to the first upper supply terminal, and the second voltage (V2) is applied to the first lower supply terminal; and a lower buffer used to output a negative polarity signal for driving another data line of the graphic displayer over a lower supply rang which is from a third voltage (V3) to a fourth voltage (V4), the lower buffer comprising an second upper supply terminal and a second lower supply terminal, wherein the third voltage (V3) is applied to the second upper supply terminal, and the fourth voltage (V4) is applied to the second lower supply terminal;

wherein V1>V2, V1>V4, V3>V2, and V3>V4, and the second voltage is equal to a common voltage minus a predetermined differential voltage, and the third voltage is equal to the common voltage (Vcom) plus the predetermined differential voltage (ΔV).

2. The output buffer as claimed of claim 1, wherein the predetermined differential voltage (ΔV) is smaller than one half of a difference between the first voltage (V1) and the fourth voltage (V4) voltage.

3. The output buffer as claimed of claim 1, wherein the predetermined differential voltage (ΔV) is smaller than 1 volt and greater than 0.2 volt.

4. The output buffer as claimed in claim 1, wherein the second voltage (V2) is one half of a difference between the first voltage (V1) and the fourth voltage (V4).

5. The output buffer of claim 4, wherein the third voltage (V3) is equal to the first voltage (V1).

6. The output buffer of claim 1, wherein the third voltage (V3) is one half of a difference between the first voltage (V1) and the fourth voltage (V4).

7. The output buffer of claim 6, wherein the second voltage (V2) is equal to the fourth voltage (V4).

8. The output buffer of claim 1, further comprising:

a switching circuit used to selectively and electrically connect the upper buffer to an odd-numbered data line or an even-numbered data line, and used to selectively and electrically connect the lower buffer to the odd-numbered data line data line or the even-numbered data line data line.

9. A controlling method of an output buffer, comprising:

providing an upper buffer and a lower buffer, wherein the upper buffer comprises a first upper supply terminal and a first lower supply terminal, and the lower buffer comprises a second upper supply terminal and a second lower supply terminal;

applying a first voltage (V1) on the first upper supply terminal, and applying a second voltage (V2) on the first lower supply terminal, and applying a third voltage (V3) on the second upper supply terminal, and applying a fourth voltage (V4) on the second lower supply terminal, wherein V1>V2, V1>V4, V3>V2, and V3>V4;

using the upper buffer to output data to a plurality of pixels thereby operating the liquid crystals of the pixels over an upper supply range, wherein the upper supply range is from V1 to V2; and using the lower buffer to output data to the pixels thereby operating the liquid crystals of the pixels over a lower supply range, wherein the lower supply range is from V3 to V4, and the second voltage is equal to a common voltage minus a predetermined differential voltage, and the third voltage is equal to the common voltage (Vcom) plus the predetermined differential voltage (ΔV).

10. The method as claimed of claim 9, wherein the predetermined differential voltage (ΔV) is smaller than one half of a difference between the first voltage (V1) and the fourth voltage (V4) voltage.

11. The method as claimed of claim 9, wherein the predetermined differential voltage (ΔV) is smaller than 1 volt and greater than 0.2 volt.

12. The method as claimed in claim 9, wherein the second voltage (V2) is one half of a difference between the first voltage (V1) and the fourth voltage (V4).

13. The method of claim 12, wherein the third voltage (V3) is equal to the first voltage (V1).

14. The method of claim 9, wherein the third voltage (V3) is one half of a difference between the first voltage (V1) and the fourth voltage (V4).

15. The method of claim 14, wherein the second voltage (V2) is equal to the fourth voltage (V4).

* * * * *